United States Patent [19]

Nissim

[11] 3,873,781

[45] Mar. 25, 1975

[54] PREVENTION OF UNAUTHORIZED USE OF TELEPHONE

[75] Inventor: Samuel Nissim, Malibu, Calif.

[73] Assignee: Electronic Arrays, Inc., Woodland Hills, Calif.

[22] Filed: Feb. 16, 1973

[21] Appl. No.: 333,032

[52] U.S. Cl. .............................. 179/81 R, 179/18 B

[51] Int. Cl. .............................. H04m 1/66

[58] Field of Search......... 179/18 DA, 27 CB, 90 D, 179/6.3 R, 90 B, 81 R, 84 R, 189, 18 BA, 18 B

[56] References Cited

UNITED STATES PATENTS

| | | | |
|---|---|---|---|
| 3,514,548 | 5/1970 | De Meo | 179/84 C |
| 3,553,382 | 1/1971 | Knox | 179/18 DA |
| 3,573,389 | 4/1971 | Greenstein | 179/18 BA |
| 3,665,162 | 5/1972 | Yamamoto et al. | 235/61.7 B |

*Primary Examiner*—Kathleen H. Claffy
*Assistant Examiner*—Joseph Popek
*Attorney, Agent, or Firm*—Ralf H. Siegemund

[57] ABSTRACT

In a telephone subscriber facility having regular dial facilities provisions for adding electronic calculator facilities to the telephone, including input means for using the dial facilities for digit key-in; a security code is stored in the calculator which provides for a comparison of the stored code with a code dialed-in prior to dial-in of a telephone number; circuit means are provided for re‌ndering dial-out, particularly of long distance numbers, dependent upon the comparison which requires that the correct security code be dialed-in first.

8 Claims, 2 Drawing Figures

PATENTED MAR 25 1975 3,873,781

PREVENTION OF UNAUTHORIZED USE OF TELEPHONE

BACKGROUND OF THE INVENTION

The present invention relates to improvements in telephone facilities, and more particularly to the prevention of unauthorized use of telephones.

The advent of the area code and of direct long distance dialing has been heralded, undoubtedly justifiably so, as an important improvement in public communication. Unfortunately, it has brought about also a new form of stealing, guardedly described as unauthorized use. Also, some "long distance calls" have been traced to playful children who happily dialed random numbers and were delighted to get a response from far away. Since direct dialing is also possible already for transatlantic calls (at least to the U.S.A. thus far), the need to protect the owner of the telephone (who is responsible for the telephone bill) from unauthorized use of his phone is rapidly increasing.

SUMMARY OF THE INVENTION

In accordance with the preferred embodiment of the present invention, it is suggested to equip the telephone with a digital storage facility for a security code. That code has to be dialed in first before regular dial-out for a telephone call can occur or become effective or be completed. The telephone includes also arithmetic logic means which are capable of comparing the stored security code with a number dialed in for that purpose and only in case of agreement can subsequent dialing proceed and become effective.

It is practical to have this dial-out blocking effective only for long distance calls. In this case, long distance dialing is detected per se, and dialing is allowed to proceed only when the proper security code was dialed in first. The invention will find particularly practical utility in case the telephone incorporates already an electronic calculator with register, microprogram storage and arithmetic/logic facilities. The security code entry and checking will appear as a special arithmetic operation involving the security code as a necessary and permanently entered parameter or constant.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates the desired function and operating steps to be performed. After the user of a telephone as improved has lifted the hand set or pressed the equivalent button) he begins to dial (statement-enter 10). Immediately it is monitored whether or not he dials a long distance number (block 11). If not, another test is performed (block 12) whether the number dialed is a specific code; if not, dial out, etc., is permitted to proceed regularly as per statement 13. If the number dialed in is the secret code, the operation proceeds along 12-yes and unlocks the long distance lock as per statement 14. The operation then returns to enter-10.

Figure 1:
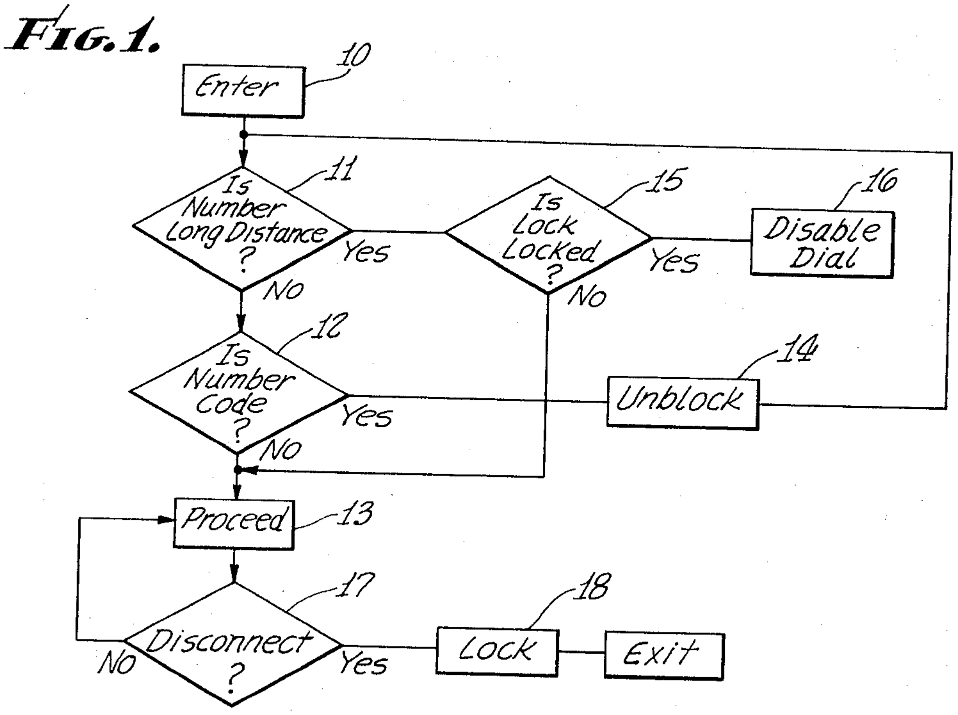
FIG. 1 is a flow chart of the operation to be carried out in accordance with an example of the preferred embodiment of the invention.

If the number dialed (or a subsequent number) is a long distance number, the operation proceeds along 11-yes and a test is performed (15) whether the long distance lock is locked or unlocked. Normally, the lock is locked unless unlocked, as per operation 14. If the lock is locked, the dial mechanism is blocked immediately, as per statement 16. If the lock is unlocked, the operation proceeds as per statement 13. The latter operation may only involve regular dial-out operation without impediment through the security circuit.

The operation continues in that it is tested whether the use of the telephone continues or whether there is a disconnect (test 17). Upon disconnect-yes, the lock is locked (statement 17) and the operation is terminated.

Figure 2:
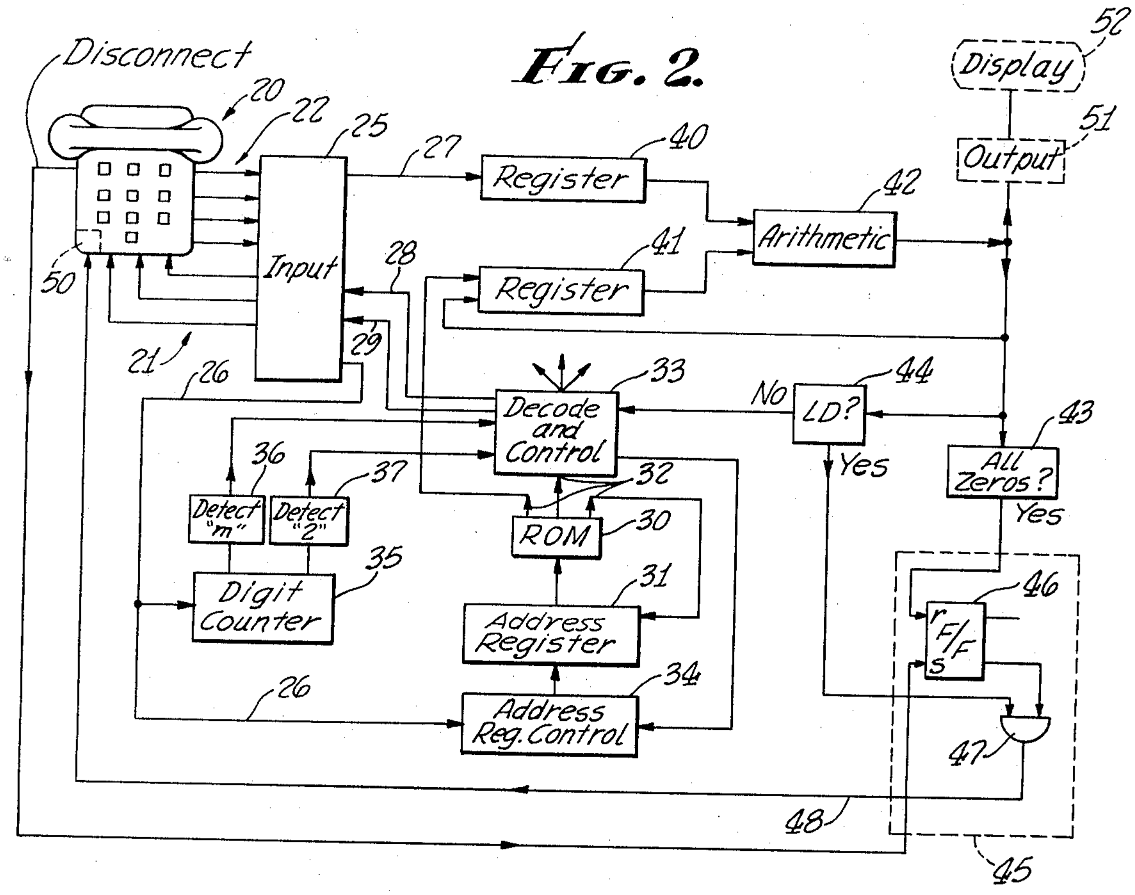
FIG. 2 is a block diagram for implementing the steps outlined in FIG. 1.

Proceeding now to FIG. 2, there is illustrated somewhat schematically a keyboard 20 pertaining to a telephone set of the touch call variety. The keys operate switches pertaining to a switching matrix for regular dial-out. The dial-out mechanism and circuit is schematically illustrated at 50 and may include oscillators for touch call operation as is now conventional. It is assumed in the present instance, that each key operates additionally a switch of a switching matrix having four rows and three columns. Signal lines 21 respectively lead to the four rows, and signal lines 22 lead to the three columns.

Lines 21 and 22 terminate in and lead to an input chip 25 of the processing equipment to be described, and as providing for a security lock. The input chip is analogous to a chip of like designation in copending application Ser. No. 101,769, filed Dec. 28, 1970, and of common assignee, now U.S. Pat. No. 3,800,129. Such input chip is also traded by the common assignee under designation EA 5004, but it will be understood that a simplified version presently suffices, even though that chip is usable directly.

Briefly, this input chip provides interrogating pulses on a cyclical, repetitive basis into, e.g. lines 21, one at a time. The input chip interrogates, also sequentially, whether any and which one of the lines 22 returns a signal to the input chip. If so, that signal will have passed to the matrix through but one line 21, one closed switched, and will be returned by but one line 22. That combination identifies the key that was depressed to close the switch at the intersection of the matrix row and column respectively represented by the one line and the one column. The interrogating signals, as well as the return scan of lines 22, are carried out by counter operation, and the keys are accordingly identified by counter states. It is convenient to identify counter states with digit values of the keyboard.

The input chip has a first output line 26 to signal that *a* key has been depressed. There is a second output line 27 through which passes a signal train identifying the digital value of the key that was depressed (i.e. the content of the scanned interrogating counter). Line 27 provides this pulse train when so commanded by a signal in an input line 28. A second command line 29 to input chip provides a control signal for the duration. The input chip should not scan the lines 21, 22 because the previous information has not yet been processed.

The data loading process is analogous to operation and involves structure analogous to operation and structure as described in the said copending application. Whenever a signal in line 26 indicates that a digit key was depressed, a subroutine of a microprogram is begun. The microprogram is stored in a read only memory, which includes the read only memory facilities 30 proper. There is an address register 31 with control 34, and a multiple path read out bus 32 leads from the ROM 30. A first path of the read out bus 32 turns back to the register 31, as each read-out microinstruction word includes the address for the next one. A second portion of the read-out bus 32 leads to an instruction decode and control circuitry 33. A third portion of bus is a selective data path and may be time shared with the first and/or second path.

Whenever a digit key has been depressed and identified in the input chip, a signal issues in line 26 (or a train of pulses passes) and a particular ROM location is accessed to begin a digit loading subroutine. Pursuant to that subroutine, a command issues in line 28 and soon digital signals are presented by the input chip on line 27. These signals may represent the keyed-in digit in bed format and will thus be comprised of four bits. These bits are now set into a register 40, whereby the microprogram and the control logic 32 determine the location or placement of the four bits in register 40.

The register 40 accumulates the digital representation of key-in digit values and stores them in the order of presentation and keying. The control logic 32 keeps track of the locations that are next in line for receiving the next four bits in any instant. If register 40 is of the recirculating kind, timing is important and the command in line 28 issues at a particular time in relation to the circulation of data in register 40.

The circuit includes a counter 35 which keeps track of the number of digits which have been keyed-in or dialed in. The counter may participate in the control operation for placement of digits into the proper positions in register 40. The counter may simply count signals from line 26, or may be incremented by microprogram operation as part of the locking subroutine.

A count number detector 36 responds after *m* (e.g. $m = 5$) digits have been keyed in. It will be recalled, that any legitimate long distance call must be preceded by the dialing in of a security code which is presumed to have *m* digits. Therefore, under such circumstances, the security code should have been loaded into register 40 after dialing of *m* digits, provided the user wishes to make a long distance call. The apparatus, of course, does not "know" this, except that a modification of the device to be discussed below may make that fact known to the equipment in advance. Presently, it is presumed that after m digits the content of register 40 may, but does not always have to be, the security code.

As detector 36 responds, the microprogram does not exit after completion of loading, but branches to an arithmetic routine. A replica of the security code number is held in a specified location of ROM 30 which is now accessed, and this replica is loaded into a second register 41. For reasons of format constraints, the stored security code number may be set into register 41, one bcd-digit (four bits) at a time, in a special loading subroutine provided for that purpose. Upon completion of that loading, the content of registers 40 and 41 is fed to the arithmetic unit 42 which subtracts the two numbers under operation of a subroutine now executed, and returns the result into register 41.

If the number that was in register 41 is in fact the security number, the difference as computed and now held in 41 will be zero in all bit positions. The arithmetic routine continues and passes this content of register 41 through testing logic 43 so as to determine whether this number is in fact an all zero number or not. If the result has an all zero number, detector 43 (being actually part of the arithmetic unit 41) responds and provides an unblock control signal to the normally locked control circuit 45.

Circuit 45 may be comprised of a flip flop 46, now set by the test signal 43-yes and this flip-flop may open a gate 47. The operations involved here and described correspond to test 12 and statement 14 in FIG. 1.

We now have to return to the purpose of the device. The purpose is to prevent unauthorized long distance dial-out, whereby unauthorized is specifically defined as a long distance dial-out attempt without prior dial-in of the security code. In case of authorized operation, the detection of dial-in of the security code completes that part of the operation, and any subsequent dialing must be considered as being the beginning of a new telephone number. That may be, but does not have to be a long distance number. Thus, response of detector 43 after dial-in of the security code, serves also as reset signal for the circuit, particularly of counter 35 and of registers 40 and 41.

Generally speaking, after dialing in of any *m*-digits, the content of register 40 will not be the security code for one of the three following reasons: (1) The user does not want to make a long distance call but a local call; in this case the entire circuitry remains ineffective as far as dial-out procedure is concerned. One could provide for erasing the content of registers 40 and 41 and of counter 35 always after m digits, but that is optional and not necessary in principle. (2) The user has already dialed in the security code and now makes the long distance call. After recognition of the security code, the circuit is reset to zero and any subsequent dial-in is deemed a new dial-in sequence. When this sequence begins, the blocking or locking circuit 45 is in the unlock state. (3) The user attempts to make an unauthorized long distance call to begin with, and the circuit 45 is in the locking state as it has not been unblocked by security number recognition. Therefore, we proceed now to dial-in of a long distance number and consider what will transpire in cases (2) and (3). In essence, we now describe test 11 of FIG. 1 and the yes or now outcome thereof.

Long distance calls are preceded by area codes, and area codes are selected from particular numbers and are recognizable as such. For example, all area codes presently used have a "1" or "0" as second digit. Therefore, any new dial sequence includes testing whether or not the second digit of a sequence that has been dialed in is a 1 or a 0. A detector 37 is connected to counter 35 and responds to the fact that the second digit of a sequence has been dialed in. It will be recalled that counter 35 keeps track of the number of keyed-in digits of a sequence. Please note that this must occur for every new dial sequence, because the principal function of the circuit is to provide security against unauthorized long distance calls.

Upon response by detector 37, the loading sequence involving the second digit is not immediately terminated, but, e.g. zeros are loaded into register 41. The particular subroutine continues as arithmetic subtracting operation, but involving only the bits of the second digit in register 40. The arithmetic operation will result in a non-zero output (four bits, at least one not a zero) of arithmetic unit 42, if the second digit dialed in is not a decimal zero. A detector 44 responds accordingly in a 44-no signal. That signal is fed to the ROM control and now a (decimal) 1 is set into register 41.

The routine continues to compare the second digit bits in register 40 with the "one" in register 41. If the outcome is again not zero, nothing further transpires, as obviously the user does not dial-out a long distance number (he may make a local call or he may be in progress of dialing in the security code, which must not have a 1 or a 0 as a second digit). This operation corresponds to branch 11-no in FIG. 1; please note that test 12 always follows test 11 simply because the security code has more than 2 digits.

In case detector 44 detects that the second dial-in digit pertains to an area code, a signal is fed to blocking circuit 45 via 44-yes. This operation corresponds to test 15 in FIG. 1. If circuit 45 is not in the blocking state (gate 47 closed because there was prior dial-in of the security code) nothing further transpires (corresponding to 15-no). The user can make his call without impediment.

If circuit 45 is in the blocking state because it was not unblocked, flip-flop 46 is reset and the signal from detector 44 is gated through gate 47 or is used to trigger a blocking control signal which is fed via line 48 to the dial mechanism 50 (statement 16 in FIG. 1). In a simple manner, the signal may operate a switch that disconnects the line analogous to replacement of the hand set. Alternatively, the signal in line 48 may be used to disable the tone-generating oscillators in the phone. Additionally, the signal may be used to dial out "operator," trigger an alarm circuit, cause a recording, etc., so that the unauthorized use of the phone can be recognized as such.

After a call has been made or after any disconnect, circuit 45 is again placed into the blocking state by resetting flip-flop 46 (statement 18 in FIG. 1). It should be mentioned, that the dial-in of the security code should not result in actual dial-out of digits. Thus, the hand set should remain in its switching and disconnect cradle during dial-in of the security code. This fact could be used to distinguish dialing of telephone numbers from dial-in of the security code. However, such distinction may not be advisable as the security code should be recognized first in either case and should be required always prior to a long distance call regardless how dialed in, unless dial-in of the security code with hand set on is made an additional requirement for permitting a long distance dial out to take place subsequently. As far as circuitry is concerned, it merely involves whether or not the recognition signal for the security code and as issued from circuit 45 is used to reset the circuitry, or whether this done always only upon lifting the hand set.

In the illustrated example, every second digit dialed in is tested as to a 1 or a 0 and the first group of *m* dialed in digits is tested whether or not this is the security code. These operations are not always needed and additional switches may be used to have certain parts of the circuit operative only when, in fact, needed. If, for example, the requirement exists that the security code be dialed in when the telephone is otherwise disconnected, decoder 37 may be disabled as long as the phone is disconnected, so that the security code may have a 1 or a 0 as second digit. Decisive is that long distance numbers must not be keyed in undetected when the telephone is connected.

It should be noted, that the blocking circuit 45 is normally in the blocking state and can be unblocked only by dial-in of the security code. Thus, it does not deteriorate reliability if dial-in of the security code requires any additional key or the like, effectively connecting into circuit detector 37 and/or the set input of flip-flop 46 only in that instance. The lock cannot possibly be unlocked when the circuits are not effective. Of course, the long distance monitor must be operative at all times when dial-out is possible, as that is its principal function.

In my copending application Ser. No. 101,768, filed Dec. 28, 1970, now U.S. Pat. No, 3,760,121. I have disclosed facilities to display dialed-in digits. the circuit as disclosed in this copending application does not provide for direct dial-out of keyed in digits, but only of digits as they are displayed. The present circuit can readily be combined with my prior circuit as the prior circuit used already facilitates for microprogram storage, an input chip, storage registers and arithmetic logic facilities. The prior circuit need only be modified by enlarging the microprogram and by having the test and comparison circuits (36, 37, etc.) included so that the needed arithmetic operations be carried out automatically.

In connection with the foregoing, it must be realized that the circuitry described presently are all basic and principle units of an electronic calculator and could be used independently from the telephone facility for that purpose and using the keyboard as calculator key-in facility for digits. This is particularly so if the telephone is supplemented by display facilities, as shown in my copending application. This aspect is indicated in FIG. 2 in dotted line, showing the arithmetic unit 42 feeding also an output chip 51 and a display 52. This chip is traded by assignee under EA 5005; and a display and other features of a calculator traded by the assignee under the designation EA S-100 can be used.

Therefore, the present apparatus may be used directly if an electronic calculator is incorporated in a telephone. Such a calculator need only be supplemented by the special area code detector 37 and by security code length detectors 36, as well as by circuitry 45 and by inclusion of the security code as a constant in the memory facilities of the calculator. Zero and non-zero detectors, as well as microinstructions plus encoding and execution control involving the comparing of two numbers, may well be included in calculators, and often portions of integrated circuits establishing an arithmetic logic unit.

The circuit above has the security code included as a constant in the ROM. If the regular, authorized user of the telephone wishes to change the security code, he has to have a new ROM. As that may be costly, the circuit should include at least one read/write storage facility that holds the security code, and the dial-in process can be used to change the security code. Such change may be effected by dialing in, first, the existing security code (testing as to correctness thus far) and by adding (or subtracting) an arbitrarily selectible number to arrive at the new security code. This mode requires enlarged calculator facilities as outlined in the preceding paragraphs.

A simplification of the circuit is readily derivable from FIG. 2. A user may wish to prevent any unauthorized use of the telephone. Under such circumstances, the dial out facility as such may be normally blocked through device 45. Special long distance dial out attempts need not be detected separately, but any effective dial out can take place only after the proper security code has been entered. The 43-yes signal thus unblocks the dial-out facility as far as actually obtaining dial-out is concerned. The signal may actually have the function of obtaining immediate line connect.

The invention has been explained above by way of example with a touch call type telephone and a keyboard analogous to a calculator keyboard. Such keyboard is advisable if, in fact, the subscriber facility incorporates calculator capabilities as described. However, the invention can be practiced also in a telephone having a regular spinning disk dial. No input scanning is needed in this case, and the dial pulses enter the input chip as pulse sequence, they are stored therein and processed further in response to the disk having returned to normal position. The loading subroutine and others are always initiated in that return which triggers the signal in line 26.

It should be mentioned that the electronic data processing operations, as described, are carried out in milliseconds and shorter, the manual dial-out operations take place considerably longer; i.e. the delay between operating two keys, or even between two dial pulse sequences is considerably longer. The several test and subtracting operations are also completed in milliseconds or less, so that the user is not aware of any delay.

In the example above, we have referred to manual dial out. The invention is, however, usable also in telephone facilities wherein record cards or the like are inserted into a suitable receiver to obtain automatic dial-out in accordance with the number stored on such a card. The security code can be entered by the authorized user in exactly the same manner using a card that bears that number.

The invention is not limited to the embodiments described above but all changes and modifications thereof not constituting departures from the spirit and scope of the invention are intended to be included.

I claim:

1. A locking system for a telephone subscriber's instrument having manual or automatic dialing facilities comprising:

input means connected to the output of the dialing facility for receiving dialed signals as produced by the dialing facility, storage means for storing a security code number unrelated to and distinguished as a number from a telephone number, arithmetic means having a first input connected to the input means and a second input connected to the storage means for comparing the dialed signals with the security/code number, and circuit means responsive to the arithmetic means for inhibiting effective dial out from the subscriber's instrument only if the security number did not precode a telephone number attempted to be dialed out.

2. The locking system as in claim 1 including means coupled to the input means for detecting dial out of a number representing a long distance call and coupled to the circuit means for activating the circuit means only when such a number was not preceded by a response from the arithmetic means.

3. A locking system for a telephone subscriber's instrument having regular dial facilities comprising:

first means in the telephone instrument for providing arithmetic operation on numbers entered by the dial facilities, second means included in the first means for storing a security code number, the first means providing for a comparison of the stored code number with a code number dialed-in by the dial facilities prior to dial-in of a telephone number, and circuit means connected to the first means for rendering dial-out from the telephone instrument dependent upon the result of the comparison in the first means.

4. In a telephone subscriber facility having regular manual and/or automatic dial facilities, a locking and selective unlocking sytem, comprising:

input means connected to the dial facilities for receiving dial signals as produced by the first storage means in the subscriber facility for storing the digits of a security code number unrelated to and distinguishible as a number from telephone numbers;

second storage means in the subscriber facility for storing representation of a particular plurality of telephone numbers;

detection means in the subscriber facility and connected to the input means and to the second storage means for determining whether a sequence of dial signals as received represents a telephone number, which is one of the particular plurality of telephone numbers;

arithmetic means in the subscriber facility and connected to the input means and to the first storage means for comparing dial signals as representing digits received by the input means, with the digits of the security code number as stored and providing a control signal if a plurality of digits received by the input means in sequence is identical with the security number;

and circuit means in the subscriber facility and connected to the detection means and to the arithmetic means and operating (i) for permitting effective dial out of a telephone number from the subscriber facility as represented by dial signals, when the telephone number is one of said particular plurality, only if the arithmetic means provided the control signal in representation of a coincidence between a plurality of digits received by the input means prior to reception of the dial signals of the telephone number in said particular class, and said stored security code, and (ii) for inhibiting the dial out of said telephone number, if said control signal was not provided prior to reception of the dial signals representing the telephone number.

5. In a telephone subscriber facility having regular manual and/or automatic dial facilities, a locking and selective unlocking system, comprising:

input means in the subscriber facility and connected for receiving dial signals as produced in the dial facility and for storing such dial signals;

storage means in the subscriber facility for storing the digits of a security code number;

first circuit means in the subscriber facility connected for normally blocking dial out of telephone numbers entered by means of the dial facilities;

arithmetic means in the subscriber facility and connected to the input means and to the storage means for comparing a sequence of dial signals as representing digits received by the input means with the digits of the security code number as stored and providing a control signal, if the particular plurality of digits are the security number; and second circuit means connected to the arithmetic means and the first means and being responsive to the control signal for unblocking dial out of a telephone number entered by means of the dial facility and following entry and receipt of the security code.

6. In a telephone facility as in claim 5, and including second storage means for holding representation of a particular plurality of different telephone numbers, distinguishing also such numbers from the security code as stored in the first mentioned storage means;

and third circuit means connected to the second storage means for testing each number entered whether or not falling in said particular plurality the third circuit means included in the first circuit means and causing the first circuit means to block said dial out only when a number entered is in said one of said particular pluralities and said arithmetic means has not produced said control signal.

7. In a telephone subscriber facility having regular manual and/or automatic dial facility, further having electronic circuit means including an arithmetic unit, storage means and control circuits for providing calculations on numbers entered through the dial facility, the calculations including subtraction between a number stored in the storage means and a number entered through the dial facility, the improvement of a telephone locking system comprising:

the storage means in the electronic circuit means storing a particular number serving as security code number;

means for operating the arithmetic means to obtain a comparison of a number entered by means of the dial facility with the security code number as stored and providing a control signal if the numbers agree; and a blocking circuit for normally inhibiting dial out of a number entered as a telephone number by means of the dial facility and being connected to receive said control signal as override, so that dial out of an entered number is not inhibited, if preceded by entry of the security code number.

8. In a facility as in claim 7, wherein each number entered is tested by the arithmetic means as to whether it is a long distance telephone number, the blocking means being effective only, when a long distance number is entered which was not preceded by entry of the security code number.

* * * * *